US012701427B2

(12) United States Patent
Voropaeva

(10) Patent No.: US 12,701,427 B2
(45) Date of Patent: Aug. 4, 2026

(54) NETWORK OPTIMIZATION IN CELLULAR COMMUNICATION NETWORKS

(71) Applicant: Elisa Oyj, Helsinki (FI)

(72) Inventor: Anastasiia Voropaeva, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/841,715

(22) PCT Filed: Apr. 17, 2024

(86) PCT No.: PCT/FI2024/050181
§ 371 (c)(1),
(2) Date: Aug. 27, 2024

(87) PCT Pub. No.: WO2024/218436
PCT Pub. Date: Oct. 24, 2024

(65) Prior Publication Data
US 2025/0113205 A1 Apr. 3, 2025

(30) Foreign Application Priority Data

Apr. 20, 2023 (FI) ..................................... 20235443

(51) Int. Cl.
H04W 16/18 (2009.01)
H04W 8/26 (2009.01)
H04W 24/02 (2009.01)

(52) U.S. Cl.
CPC ........... H04W 16/18 (2013.01); H04W 24/02 (2013.01); H04W 8/26 (2013.01)

(58) Field of Classification Search
CPC ..... H04W 24/02; H04W 24/10; H04W 16/18; H04W 48/12; H04W 8/26; H04W 16/14;
(Continued)

(56) References Cited

U.S. PATENT DOCUMENTS

| 11,240,689 B1 | 2/2022 | Shankaranarayanan et al. |
| 11,589,246 B2 * | 2/2023 | Gan ...................... H04W 84/18 |

(Continued)

FOREIGN PATENT DOCUMENTS

| CN | 102318390 A * | 1/2012 | ............ H04W 24/02 |
| CN | 106792902 A * | 5/2017 | |

(Continued)

OTHER PUBLICATIONS

Translation of CN-115604735-A (Year: 2023).*

(Continued)

*Primary Examiner* — Matthew C Sams
(74) *Attorney, Agent, or Firm* — Laine IP Oy

(57) ABSTRACT

According to an example aspect of the present invention, there is provided a method for network optimization in a cellular communication network, the method comprising determining, by an apparatus, at least two first cells, wherein the at least two first cells are configured to use a first cell parameter value in the cellular communication network, determining, by the apparatus, a cause cell for each of the at least two first cells, wherein the cause cells are cells that are configured to use the first cell parameter value and each cause cell is within a predetermined number of hops from a respective first cell, sorting, by the apparatus, the cause cells into a list in the order of number of occurrences as a cause cell and configuring, by the apparatus, a first cell in the list to use a second cell parameter value.

19 Claims, 5 Drawing Sheets

(58) Field of Classification Search
CPC ..... H04W 24/08; H04W 72/21; H04W 72/23;
H04W 72/27; H04W 72/542; H04W
16/10; H04W 16/20; H04W 24/04; H04W
36/0061; H04W 36/0079; H04W 36/0083;
H04W 36/00835; H04W 36/008357;
H04W 36/165; H04W 36/249; H04W
36/38; H04W 64/003; H04W 74/085;
H04W 74/0858; H04W 84/045; H04W
84/12; H04W 84/18; H04W 88/08; H04W
88/18; H04W 92/20
See application file for complete search history.

(56) References Cited

U.S. PATENT DOCUMENTS

| | | | | |
|---|---|---|---|---|
| 2010/0008235 | A1* | 1/2010 | Tinnakornsrisuphap | ................... H04L 61/5046 370/254 |
| 2010/0040038 | A1* | 2/2010 | Tinnakornsrisuphap | ................... H04W 8/26 370/345 |
| 2010/0311407 | A1 | 12/2010 | Yao et al. | |
| 2012/0009957 | A1* | 1/2012 | Murasawa | .............. H04W 8/26 455/507 |
| 2014/0378148 | A1* | 12/2014 | Moser | ............ H04W 36/00835 455/442 |
| 2015/0043386 | A1* | 2/2015 | Racz | ................... H04L 41/0813 370/255 |
| 2016/0014651 | A1 | 1/2016 | Wellington | |
| 2018/0262922 | A1* | 9/2018 | Mackenzie | .......... H04W 24/02 |
| 2018/0270671 | A1* | 9/2018 | Agnihotri | ............ H04W 24/02 |
| 2020/0112911 | A1* | 4/2020 | Ozturk | .................. H04W 48/12 |
| 2021/0409978 | A1* | 12/2021 | Mackenzie | .......... H04W 24/02 |
| 2022/0150715 | A1* | 5/2022 | Nakahira | ............. H04W 16/18 |
| 2022/0295308 | A1 | 9/2022 | Dang et al. | |
| 2024/0430701 | A1* | 12/2024 | Khalid | ................. H04W 24/02 |

FOREIGN PATENT DOCUMENTS

| | | | | | |
|---|---|---|---|---|---|
| CN | 112771797 | A | * | 5/2021 | ......... H04J 11/0069 |
| CN | 115604735 | A | * | 1/2023 | |
| EP | 3598789 | A1 | * | 1/2020 | ........... H04W 16/18 |
| WO | WO2010006298 | A1 | | 1/2010 | |
| WO | WO2017204741 | A1 | | 11/2017 | |

OTHER PUBLICATIONS

Oppolzer et al: Cell Identifier Assignment in Two-Tier Femtocell Networks. 2006 IEEE 63rd Vehicular Technology Conference, IEEE, Jun. 2, 2013, pp. 1-5.

\* cited by examiner

114c

114d

114a

114b

114g

114f

114e

114h

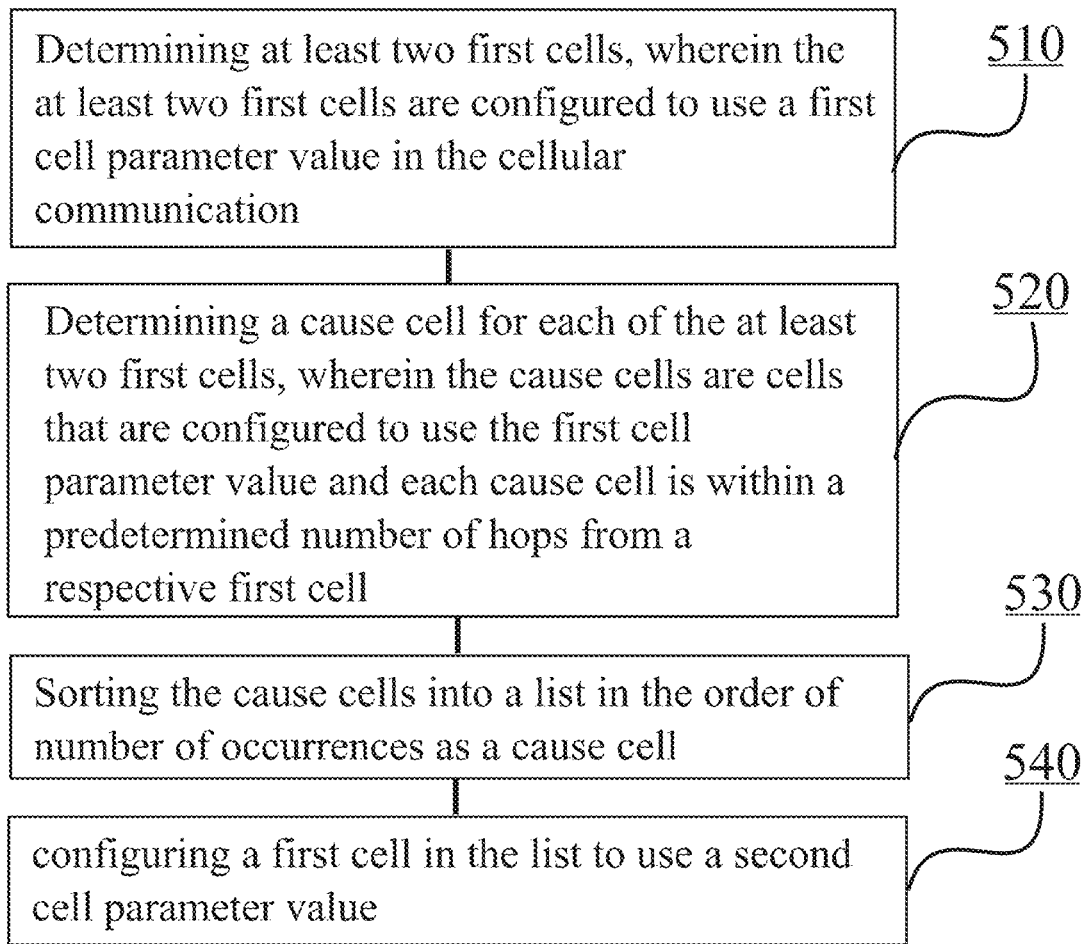

Determining at least two first cells, wherein the at least two first cells are configured to use a first cell parameter value in the cellular communication 510

Determining a cause cell for each of the at least two first cells, wherein the cause cells are cells that are configured to use the first cell parameter value and each cause cell is within a predetermined number of hops from a respective first cell 520

Sorting the cause cells into a list in the order of number of occurrences as a cause cell 530 configuring a first cell in the list to use a second cell parameter value 540

FIGURE 5

NETWORK OPTIMIZATION IN CELLULAR COMMUNICATION NETWORKS

FIELD

The present disclosure relates to cellular communication networks and more specifically, to network optimization in such networks.

BACKGROUND

Communication networks may comprise at least core networks and, in some networks, also Radio Access Networks, RANs. For example, cellular communication networks comprise a core network tasked with functions affecting the network as a whole, while a RAN enables connectivity to the network to subscribers with User Equipments, UEs, furnished with radio communication capabilities. Network optimization is needed to improve or maintain performance of a cellular communication network, so that the network would operate as well as possible. There is therefore a need in general to provide enhancements for network optimization, to enable efficient usage of the network and its resources.

SUMMARY

According to some aspects, there is provided the subject-matter of the independent claims. Some embodiments are defined in the dependent claims.

According to a first aspect of the present disclosure, there is provided a method comprising determining, by an apparatus, at least two first cells, wherein the at least two first cells are configured to use a first cell parameter value in the cellular communication network, determining, by the apparatus, a cause cell for each of the at least two first cells, wherein the cause cells are cells that are configured to use the first cell parameter value and each cause cell is within a predetermined number of hops from a respective first cell, sorting, by the apparatus, the cause cells into a list in the order of number of occurrences as a cause cell and configuring, by the apparatus, a first cell in the list to use a second cell parameter value.

According to a second aspect of the present disclosure, there is provided an apparatus comprising means for determining, by an apparatus, at least two first cells, wherein the at least two first cells are configured to use a first cell parameter value in the cellular communication network, means for determining, by the apparatus, a cause cell for each of the at least two first cells, wherein the cause cells are cells that are configured to use the first cell parameter value and each cause cell is within a predetermined number of hops from a respective first cell, means for sorting, by the apparatus, the cause cells into a list in the order of number of occurrences as a cause cell and means for configuring, by the apparatus, a first cell in the list to use a second cell parameter value.

According to a third aspect of the present disclosure, there is provided a computer program comprising instructions which, when the program is executed by an apparatus, cause the apparatus to carry out determining at least two first cells, wherein the at least two first cells are configured to use a first cell parameter value in the cellular communication network, determining a cause cell for each of the at least two first cells, wherein the cause cells are cells that are configured to use the first cell parameter value and each cause cell is within a predetermined number of hops from a respective first cell, sorting the cause cells into a list in the order of number of occurrences as a cause cell and configuring a first cell in the list to use a second cell parameter value.

According to a fourth aspect of the present disclosure, there is provided an apparatus comprising at least one processing core and at least one memory storing instructions that, when executed by the at least one processing core, cause the apparatus at least to determine at least two first cells, wherein the at least two first cells are configured to use a first cell parameter value in the cellular communication network, determine a cause cell for each of the at least two first cells, wherein the cause cells are cells that are configured to use the first cell parameter value and each cause cell is within a predetermined number of hops from a respective first cell, sort the cause cells into a list in the order of number of occurrences as a cause cell and configure a first cell in the list to use a second cell parameter value.

According to a fifth aspect of the present disclosure, there is provided a non-transitory computer readable medium having stored thereon a set of computer readable instructions that, when executed by at least one processor, cause an apparatus to determine at least two first cells, wherein the at least two first cells are configured to use a first cell parameter value in the cellular communication network, determine a cause cell for each of the at least two first cells, wherein the cause cells are cells that are configured to use the first cell parameter value and each cause cell is within a predetermined number of hops from a respective first cell, sort the cause cells into a list in the order of number of occurrences as a cause cell and configure a first cell in the list to use a second cell parameter value.

BRIEF DESCRIPTION OF THE DRAWINGS

FIG. 5 is a flow graph of a method in accordance with at least some embodiments.

EMBODIMENTS

Figure 1:
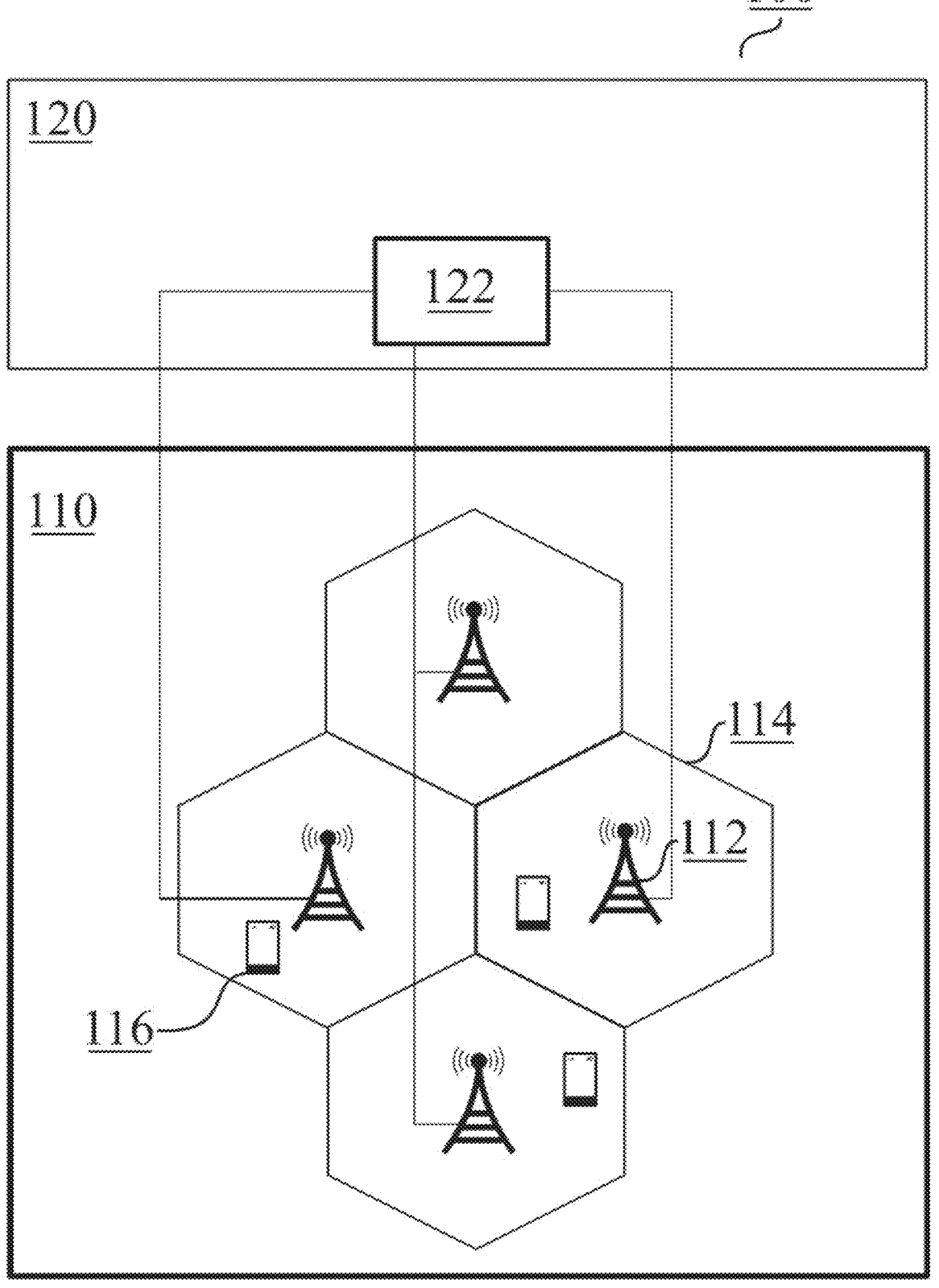
FIG. 1 illustrates an example of a cellular communication network in accordance with at least some embodiments.

Network optimization in cellular communication networks may be enhanced by the procedures described herein. More specifically, the procedures described herein enable efficient resolution of conflicts between parameter values of cells of a cellular communication network. If at least two first cells of the cellular communication network within a predetermined number of hops are configured to use the same cell parameter value, such as a cell identifier, like Physical Cell Identifier, PCI, a cause cell is determined for each of the at least two first cells. A cause cell is a conflicting cell and determined for every first cell in the cellular communication network, i.e., for every cell using the same cell parameter value. In general, first cells may be cells not having unique cell parameters values, like PCI, in a neighbourhood, e.g., within two hops. The predetermined number of hops may thus refer to one, two or even more hops, if a User Equipment, UE, is in vicinity of the conflicting cells.

That is, if two cells of the cellular communication network are in close vicinity of each other and configured to use the same cell parameter value, such as the cell identifier, it may cause difficulties for various network functions, e.g., handling mobility of UEs. These two cells would cause a conflict for each other, and hence may be referred to as a cause or a conflicting cell from the other cell's perspective.

The cause cell is a cell that is configured to use the same cell parameter value within the predetermined number of hops from a respective first cell, thereby causing a conflict with the respective first cell. A conflict thus refers to using the same cell parameter value within the predetermined number of hops, e.g., with a first or a second tier neighbour. That is, the predetermined number of hops may be two and in such a case the conflict refers to using the same cell parameter value with one hop and two hop neighbours. In some example embodiments, one cause cell may cause conflicts to multiple cells. In the network, there may be multiple conflict chains like that, each having a different cause cell. After collecting conflicts, all cause cells may then be listed in the order of occurrence as a cause cell. When modifying a problematic parameter value on a cause cell with the highest number of occurrences, multiple conflicts may be tackled. Hence, network optimization actions required to resolve conflicts may be minimized.

The cause cells are then listed in the order of occurrence as a cause cell to generate a list of cause cells and a configuration of a cause cell with a highest number of occurrences in the list is changed, to avoid conflicts with other cells. Configurations of other cells may be changed as well after checking the situation again, if necessary. Network optimization is hence enhanced by minimizing the number of actions required to resolve conflicts.

In general, a conflict may refer to a collision or a confusion. For instance, a PCI collision occurs when two direct neighbour cells share the same PCI, whereas a PCI confusion occurs when two cells on a given cell's neighbour list share the same PCI.

FIG. 1 illustrates an example of a cellular communication network in accordance with at least some embodiments. FIG. 1 illustrates cellular communication network 100 comprising Radio Access Network, RAN, 110 and core network 120. RAN 110 further comprises multiple Base Stations, BSs, 112. BSs 112 are configured to operate in accordance with a cellular communication standard, such as 2G, 3G, Long Term Evolution, LTE, 4G, or fifth generation, 5G, also known as New Radio, NR, all as specified by the $3^{rd}$ Generation Partnership Project, 3GPP. Each BS 112 is associated with at least one cell 114. That is, each BS 112 is configured provide at least one cell 114 for communication. In cellular communication network 100 illustrated in FIG. 1, each BS 112 provides one cell for communication. In some embodiments, each BS 112 may provide for example three cells for communication, wherein said three cells provide coverage with an angle of 120 degrees using different frequencies. In some networks, different BSs may be configured to provide different numbers of cells, such as sectorized cells or overlapping cells on different frequency ranges.

RAN 110 is further in communication with one or more User Equipments, UEs, 116. BSs 112 communicate with UEs 116 over an air interface wirelessly using radio communications, within cells 114. Each UE 116 comprises or is incorporated into, for example, a smartphone, feature phone, tablet or laptop computer, Internet-of-Things, IoT, node, smart wearable or a connected car connectivity module, for example. Naturally, separate UEs 116 need not be of a same type.

BSs 112 of RAN 110 are coupled with core network nodes of core network 120 via links, which may comprise wire-line connections, for example. A few of such links are illustrated in FIG. 1. Core network 120 comprises for example Mobility Management Entities, MMEs, serving gateways and/or Access and Mobility management Functions, AMFs, for example. The core network may comprise a gateway, enabling communication with further networks, via at least one inter-network link. Some aggregate networks may have more than one core network, which are then connected to each other using at least one communication link.

Core network 120 illustrated in FIG. 1 further comprises apparatus 122. Apparatus 122 may be configured to monitor cellular communication network 100, in particularly RAN 110. Apparatus 122 may be configured to perform actions to optimize the operation of RAN 110. For instance, apparatus 122 may be an apparatus for network optimization of RAN 110, such as for resolving conflicts, such as conflicts between cells 114 in RAN 110. In some embodiments, apparatus 122 may be located in RAN 110 or outside of cellular communication network 100.

Various changes may take place in RAN 110. For example, the topology of RAN 110 may change often due to addition of new neighbour relations between cells 114, building new sites, etc. Apparatus 122 may hence monitor RAN 110 and the performance of RAN 110. The changes in the topology of RAN 110 may introduce new conflicts between cells. At least in some embodiments, a conflict between cells refers to a situation, wherein at least one neighbour of cell 114 and/or at least one neighbour of a neighbour of cell 114, share the same cell parameter value as cell 114. That is, a conflict occurs if the at least one neighbour of cell 114 and/or at least one neighbour of a neighbour of cell 114 are configured to use the same cell parameter value.

The cell parameter value may be an identifier of cell 114, such as a PCI, or a Scrambling Code, SC, that cell 114 is configured to use. Alternatively, the cell parameter value may be a configuration parameter value of BS 112 of cell 114, like a Base Station Identity Code, BSIC, or a configuration of a Broadcast Control Channel, BCCH, etc., that cell 14 is configured to use. The conflicts between cells 114 may be difficult to avoid, because the range of available values for these cell parameter values is limited. For example, there are only 512 possible values for PCI parameter values in LTE networks.

Conflicts cause performance degradation in RAN 110 and should be hence avoided. Therefore, apparatus 122 may detect conflicts and resolve those by assigning a new cell parameter value, like a PCI, to at least one conflicting cell, to optimize and maintain network performance. More specifically, embodiments of the present disclosure enable minimization of changes in RAN 110 when the operation of the network is optimized. When resolving conflicts, the number of optimization actions is minimized in order to reduce risks of any service disturbances and to simplify follow-up of the network performance after changes are done.

Figure 2:
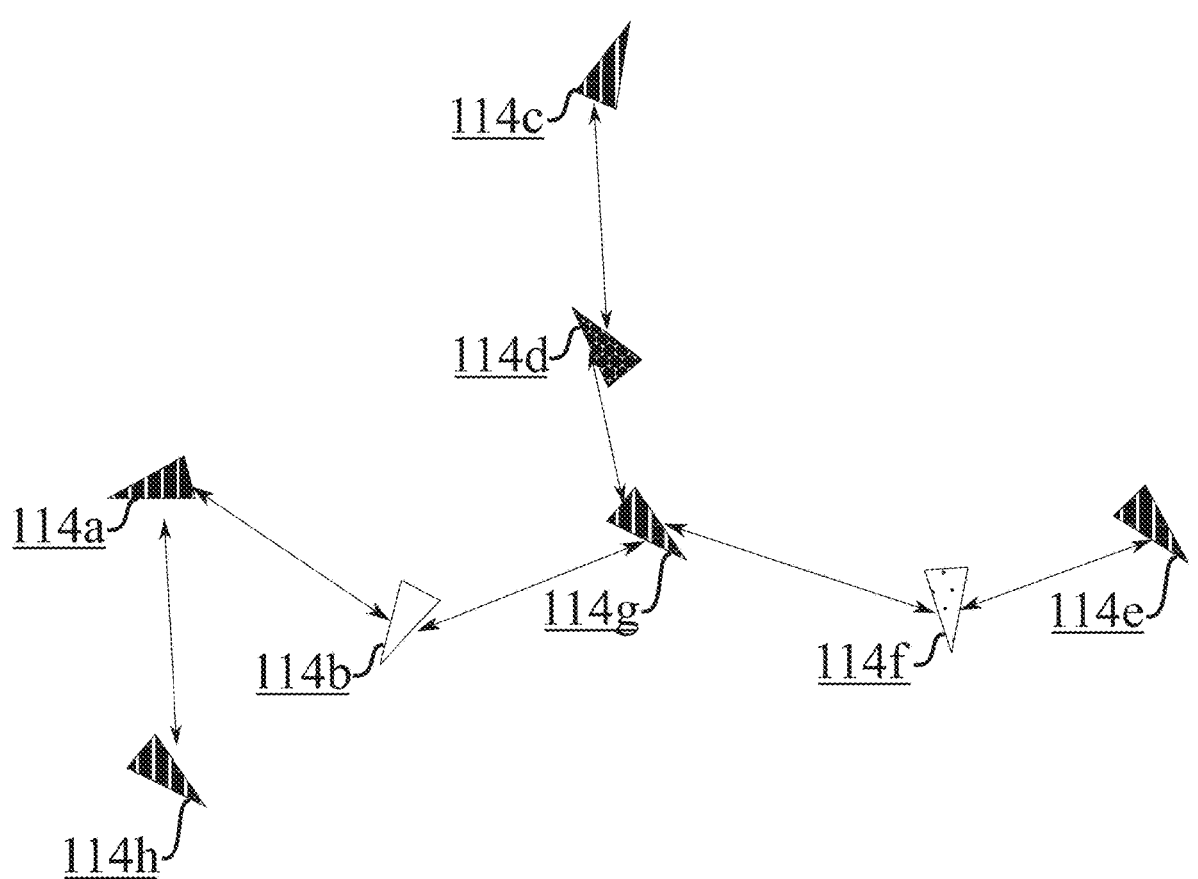
FIG. 2 illustrates an example of a network scenario in accordance with at least some embodiments.

FIG. 2 illustrates an example of a network scenario in accordance with at least some embodiments. In FIG. 2, cells 114a-g of a cellular communication network are illustrated. Cells 114a, 114c, 114e, 114g and 114h have the same cell parameter value, such as PCI, SC or BSIC. Cells 114b, 114d and 114f have a different cell parameter value compared to each other, and compared to cells 114a, 114c, 114e, 114g and 114h.

For instance, if the cell parameter values are PCIs, FIG. 2 illustrates an example for resolving PCI conflicts. That is, FIG. 2 illustrates an example for resolving conflicts between PCIs, i.e., a collision or confusion between PCIs. The cell identifier of cells 114*a*, 114*c*, 114*e*, 114*g* and 114*h* may be PCI #1, the cell identifier of cell 114*b* may be PCI #2, the cell identifier of cell 114*d* may be PCI #3 and the cell identifier of cell 114*f* may be PCI #4. It is noted that even though the cell identifiers, like PCIs, are used as an example, embodiments of the present disclosure may be applied similarly for any other cell parameter value, such as SC or BSIC, for example.

As a first step, apparatus 122 may be configured to search for a conflict within one hop from cell 114*a*, i.e., to determine whether there is a conflict between cells 114*a* and 114*b* and/or between cells 114*h*. That is, apparatus 122 may search for the first conflict with the first tier neighbours of cell 114*a*, like cells 114*b* and 114*h* in the example of FIG. 2, wherein cell 114*a* may be referred to as a first cell. Searching for the conflict may be performed to find out if there is a conflict between the cell parameter values used by cell 114*a* and the cells within one hop from cell 114*a*. A one-hop neighbourhood of a cell comprises all neighbours of the cell. A two-hop neighbourhood of a cell comprises the one-hop neighbourhood and neighbours of the neighbours of the cell.

Searching for the conflict within one hop may comprise detecting whether the cell parameter value of cell 114*a* is the same as the cell parameter value of cell 114*b*. For instance, apparatus 122 may receive configurations of cells 114*a* and 114*b* and determine the PCIs that cells 114*a* and 114*b* are configured to use. The configurations may be received for example from an Operations Support System, OSS, possibly as Configuration Management, CM, data.

Apparatus 122 may then compare the PCI of cell 114*a* to the PCI of cell 114*b*. In the example of FIG. 2, the cell parameter value of cell 114*a* is different than the cell parameter value of cell 114*b* and hence, apparatus 122 may determine that cell 114*a* is not configured to use the same cell parameter value as cell 114*b*. That is, apparatus 122 may determine that cell 114*b* is not configured to use a first cell parameter value, like PCI #1 used by cell 114*a*. Hence, apparatus 122 may determine that cell 114*a* is not a first cell having a conflict with cell 114*b*, i.e., cell 114*b* is not a cause cell for cell 114*a*.

Furthermore, searching for the conflict within one hop may comprise detecting whether the cell parameter value of cell 114*a* is the same as the cell parameter value of cell 114*h*. For instance, apparatus 122 may receive configurations of cells 114*a* and 114*h* and determine the PCIs that cells 114*a* and 114*h* are configured to use. Apparatus 122 may then compare the PCI of cell 114*a* to the PCI of cell 114*h*. In the example of FIG. 2, the cell parameter value of cell 114*a* is the same as the cell parameter value of cell 114*h* and hence, apparatus 122 may determine that cell 114*a* is configured to use the same cell parameter value as cell 114*h*. That is, apparatus 122 may determine that cell 114*h* is configured to use the first cell parameter value, like PCI #1 used by cell 114*a*. Hence, apparatus 122 may determine that cell 114*a* is a respective first cell for cause cell 114*h*, configured to use the first cell parameter value in the cellular communication network of the example illustrated in FIG. 2. Apparatus 122 may also determine that cell 114*h* is a cause cell for the conflict between cells 114*a* and 114*h*, as cell 114*h* is configured to use the first cell parameter value and is within two hops from the respective first cell, i.e., cell 114*a*. In the example of FIG. 2, two hops is used as an example of the predetermined number of hops. In some example embodiments, the predetermined number of hops or more than two hops, depending on the network scenario and coverage of cells.

As a second step, apparatus 122 may be configured to search for a conflict within two hops from cell 114*a*, i.e., to determine whether there is a conflict between cell 114*a* and cell 114*g*. That is, apparatus 122 may search for the conflict within the set of two-hop neighbours of cell 114*a*, like cell 114*g* in the example of FIG. 2, wherein cell 114*a* may be referred to as a first cell. Searching for the conflict may be performed to find out if there is a conflict between the cell parameter values used by cell 114*a* and the cells within two hops from cell 114*a*.

Searching for the two-hop conflict may comprise detecting whether the identifier of cell 114*a* is the same as the cell parameter value of cell 114*g*. For instance, apparatus 122 may receive configurations of cells 114*a* and 114*g* and determine the PCIs that cells 114*a* and 114*g* are configured to use. Apparatus 122 may then compare the PCI of cell 114*a* to the PCI of cell 114*g*. In the example of FIG. 2, the cell parameter value of cell 114*a* is the same as the cell parameter value of cell 114*g* and hence, apparatus 122 may determine that cell 114*a* is configured to use the same cell parameter value as cell 114*g*. That is, apparatus 122 may determine that cell 114*g* is configured to use the first cell parameter value, like PCI #1 used by cell 114*a*. Hence, apparatus 122 may determine that cell 114*a* is a respective first cell for cause cell 114*g*, configured to use the first cell parameter value in the cellular communication network of the example illustrated in FIG. 2. Apparatus 122 may also determine that cell 114*g* is a cause cell for the conflict between cells 114*a* and 114*g*, as cell 114*g* is configured to use the first cell parameter value and is within two hops from the respective first cell, i.e., cell 114*a*.

Apparatus 122 may hence search for at least one first conflict within first tier neighbours of one first cell, like cell 114*a*, and for at least one second conflict within second tier neighbours of said one first cell. Apparatus 122 may then determine that said one first cell belongs to the at least two first cells if the at least one first or second conflict is found.

As a third step, after detecting the second conflict (i.e., the conflict between cells 114*a* and 114*g*), apparatus 122 may store information about the detected conflict to its memory or to an external memory, possibly via a communication link. Apparatus may for example mark cell 114*a* as a first cell and cell 114*g* as a cause cell of cell 114*a* when the second conflict is detected.

Apparatus 122 may repeat the first and second steps, and the third step if needed, for other cells as well. For instance, apparatus 122 may search for a first conflict within a first hop from cell 114*c*, i.e., to determine whether there is a conflict between cell 114*c* and cell 114*d*. That is, apparatus 122 may search for the first conflict within the first tier neighbours of cell 114*c*, like cell 114*d* in the example of FIG. 2, wherein cell 114*c* may be a first cell. Searching for the first conflict may comprise detecting whether the cell parameter value of cell 114*c* is the same as the cell parameter value of cell 114*d*. In the example of FIG. 2, the cell parameter value of cell 114*c* is different than the cell parameter value of cell 114*d* and hence, apparatus 122 may determine that cell 114*c* is not configured to use the same cell parameter value as cell 114*d*. Hence, apparatus 122 may determine that cell 114*d* is not a cause cell for cell 114*c*.

Apparatus 122 may then search for a second conflict within two hops from cell 114*c*, i.e., to determine whether there is a conflict between cell 114*c* and cell 114*g*. That is, apparatus 122 may search for the second conflict within the second tier neighbours of cell 114*c*, like cell 114*g* in the example of FIG. 2, wherein cell 114*c* may be a first cell. Searching for the second conflict may comprise detecting whether the cell parameter value of cell 114c is the same as the cell parameter value of cell 114g. Apparatus 122 may compare the PCI of cell 114c to the PCI of cell 114g. In the example of FIG. 2, the cell parameter value of cell 114c is the same as the cell parameter value of cell 114g and hence, apparatus 122 may determine that cell 114c is configured to use the same cell parameter value as cell 114g. That is, apparatus 122 may determine that cell 114g is configured to use the first cell parameter value, like PCI #1 used by cell 114c. Hence, apparatus 122 may determine that cell 114c is a first cell configured to use the first cell parameter value in the cellular communication network of the example illustrated in FIG. 2. Apparatus may also determine that cell 114g is a cause cell for the conflict between cells 114c and 114g, as cell 114g is configured to use the first cell parameter value and within two hops from the respective first cell, i.e., cell 114c.

After detecting the conflict between cells 114c and 114g, apparatus 122 may store information about the conflict to its memory or an external memory, possibly via a communication link. Apparatus 122 may for example mark cell 114c as a first cell and cell 114g as a cause cell of cell 114c when the conflict is detected.

As a fourth step, apparatus 122 may perform the first and second steps for other cells, the third step if needed. When apparatus 122 performs the first and second steps for other cells, in the example of FIG. 2 apparatus 122 may also determine at least that cell 114e is a first cell configured to use the first cell parameter value in the cellular communication network of the example illustrated in FIG. 2. Apparatus 122 may also determine that cell 114g is a cause cell for the conflict between cells 114e and 114g, as cell 114g is configured to use the first cell parameter value and is within two hops from a respective first cell, like cell 114e in the example of FIG. 2.

Apparatus 122 hence determines at least two first cells, wherein the at least two first cells are configured to use a first cell parameter value in a cellular communication network. That is, in the example of FIG. 2, apparatus 122 determines the at least two cells as cells 114a, 114c, 114e and 114g. Apparatus 122 also determines a cause cell for each of the at least two first cells, wherein the cause cells are cells that are configured to use the first cell parameter value and each cause cell is within two hops from a respective first cell. So for cells 114a, 114c and 114e, the cause cell is cell 114g. The cause cells for cell 114g are cells 114a, 114c and 114e.

As a fifth step, apparatus 122 sorts marked cells in the order of their number of occurrences as a cause cell. That is, apparatus 122 sorts the cause cells into a list in the order of occurrence as a cause cell. So in the example of FIG. 2, cell 114g is sorted as the first cell in the list, because it is the cause cell for cells 114a, 114c and 114e. Cell 114g thus is a cause cell for three first cells, i.e., a number of occurrences as a cause cell is three for cell 114g. The number of occurrences as a cause cell is one for cells 114a, 114c, 114e and 114h. Cells 114a, 114c, 114e and 114h may then be sorted into the list for example in an alphabetical order, or in any other order, after cell 114g.

After sorting cells 114a, 114c, 114e and 114g into the list, apparatus 122 configures the first cause cell in the list with the highest number of occurrences, i.e., cell 114g, to use a second cell parameter value, wherein the first cell parameter value is different than the second cell parameter value. The second cell parameter value may be for example PCI #4, i.e., a cell parameter value that is not used by any other cell within two hops from cell 114g. That is, the first cause cell in the list may be configured to use the second cell parameter, wherein the second cell parameter is a free, unused parameter within the predetermined number of hops.

For instance, a PCI may be modified to any arbitrary PCI (within available values) such that is does not conflict with cells around. That is, the second cell parameter value may refer to a PCI value that is unique within the neighbourhood, i.e., within the predetermined number of hops, like two hops in the example of FIG. 2. A cell may be within the neighbourhood from another cell, if the cell is a first tier neighbour or a second tier neighbour of said another cell. There may be for example 512 PCI values and hence, the second cell parameter value may be only unique within the neighbourhood but not unique when considering the entire cellular communication network.

As another example, a conflict is found between cells A-B, apparatus 122 may collect all used cell parameter values, such as PCIs, from all neighboring cells of cell A and allocate a clean unused value to cell A. If all values are used, then a search may be performed for the most remote PCI value. The most remote PCI may be allocated to the "first" cell A as a second cell parameter value to be used by cell A, instead of the first parameter value that was used by cell A before. That is, the second cell parameter value does not refer to a "second cell's parameter value". After new value is assigned to "first" cell A (assigning may refer to having an inbuilt memory in the algorithm, i.e., in apparatus 122 running the algorithm), the second cell (cell B) may be checked for a conflict. Since, the PCI was modified on cell A, the conflict does not exist anymore, so there is no need to modify the PCI of cell B anymore.

In some example embodiments, the cell parameter values may be referred to as cell-parameter values. That is, the first cell parameter value may be referred to as a first cell-parameter value and the second cell parameter value may be referred to as a second cell-parameter value. The first cell parameter value may be for example a first PCI and the second cell parameter value may be a second PCI. That is, the second cell parameter value may not refer to a value of any second cell, but it may refer to a different parameter value compared to the first cell parameter value.

As a sixth step, apparatus 122 may, after configuring cell 114g to use the second cell parameter value, repeat the first and second steps, and possibly the third step if needed. Apparatus 122 may determine, after configuring the first cell (cell 114g) in the list to use the second cell parameter value (PCI #4), whether a second cell (cell 114a) in the list needs to be configured to use a third cell parameter value (PCI #5), which is a unused, free parameter. Therefore, it may be checked whether the change of the cell parameter value of the first cell (cell 114g) in the list has eliminated other conflicts.

In the example of FIG. 2, apparatus 122 may determine that the second cell (cell 114a) in the list does not need to be configured to use the third cell parameter value. Apparatus 122 may then refrain from changing the configuration of the second cell (cell 114a) in the list to use the first cell parameter value (PCI #1). That is, the second cell (114a) may continue using the first cell parameter value (PCI #1).

Alternatively, if for example cell 114c would be within two hops from cell 114a, apparatus 122 determines, after configuring the first cell (cell 114g) in the list to use the second cell parameter value (PCI #4), that the second cell (cell 114a) in the list needs to be configured to use the third cell parameter value (PCI #5). Apparatus 122 then configures the second cell (114a) in the list to use the third cell parameter value (PCI #5).

In the example of FIG. 2, 3 conflicts may be hence detected for which cell 114g is the cause cell; cell 114a→cell 114b→cell 114g, cell 114c→cell 114d→cell 114g and cell 114e→cell 114f→cell 114g. However, with one change, i.e., by changing the cell parameter value of cell 114g, it is possible to resolve all the conflicts. The number of optimization actions is thus minimized.

Figure 3:
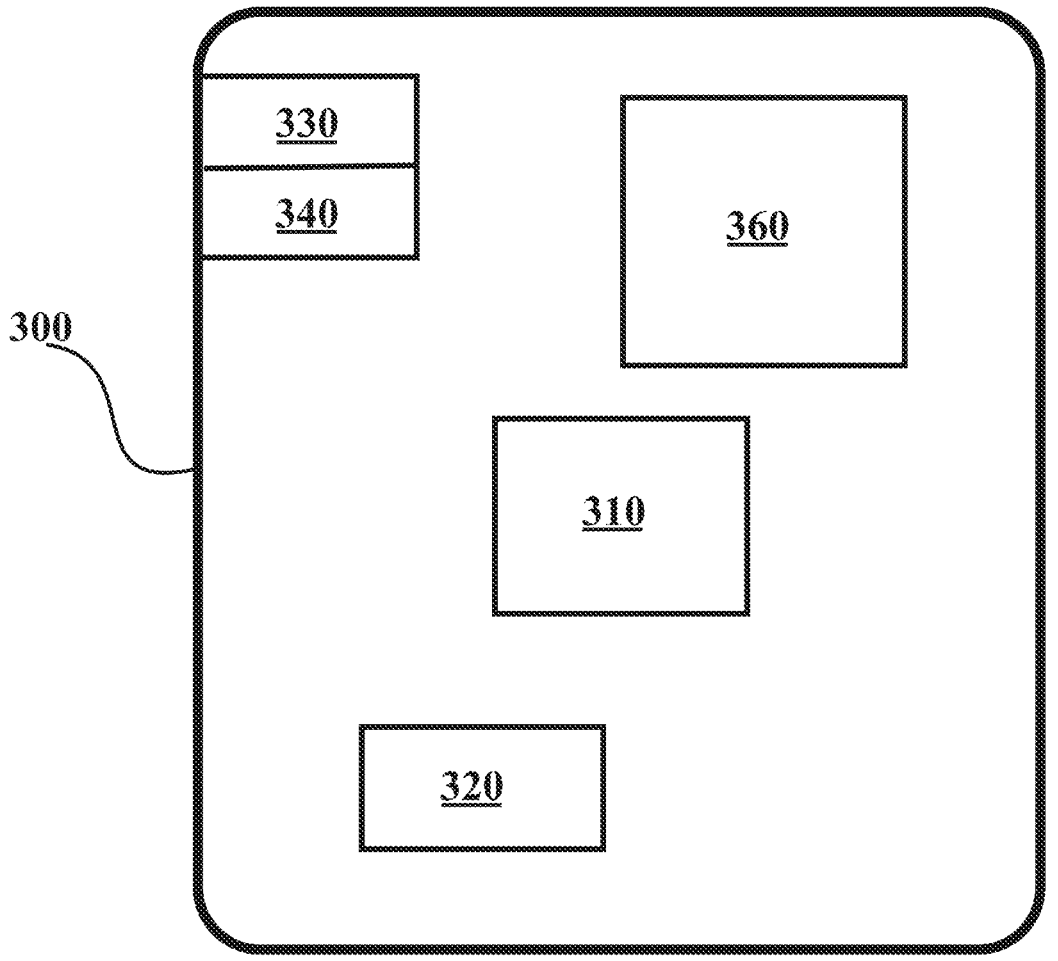
FIG. 3 illustrates an example apparatus capable of supporting at least some embodiments.

FIG. 3 illustrates an example apparatus capable of supporting at least some embodiments. Illustrated is device 300, which may comprise, for example, apparatus 122 configured to perform the herein disclosed network optimization method. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one AMD Opteron and/or Intel Xeon processor. Processor 310 may comprise at least one application-specific integrated circuit, ASIC. Processor 310 may comprise at least one field-programmable gate array, FPGA. Processor 310 may be means for performing method steps in device 300, and causing performance of the method steps, such as determining, sorting and/or configuring. Processor 310 may be configured, at least in part by computer instructions, to perform actions.

As used in this application, the term circuitry covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Ethernet and/or signalling system 7, SS7, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure alarm handling parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
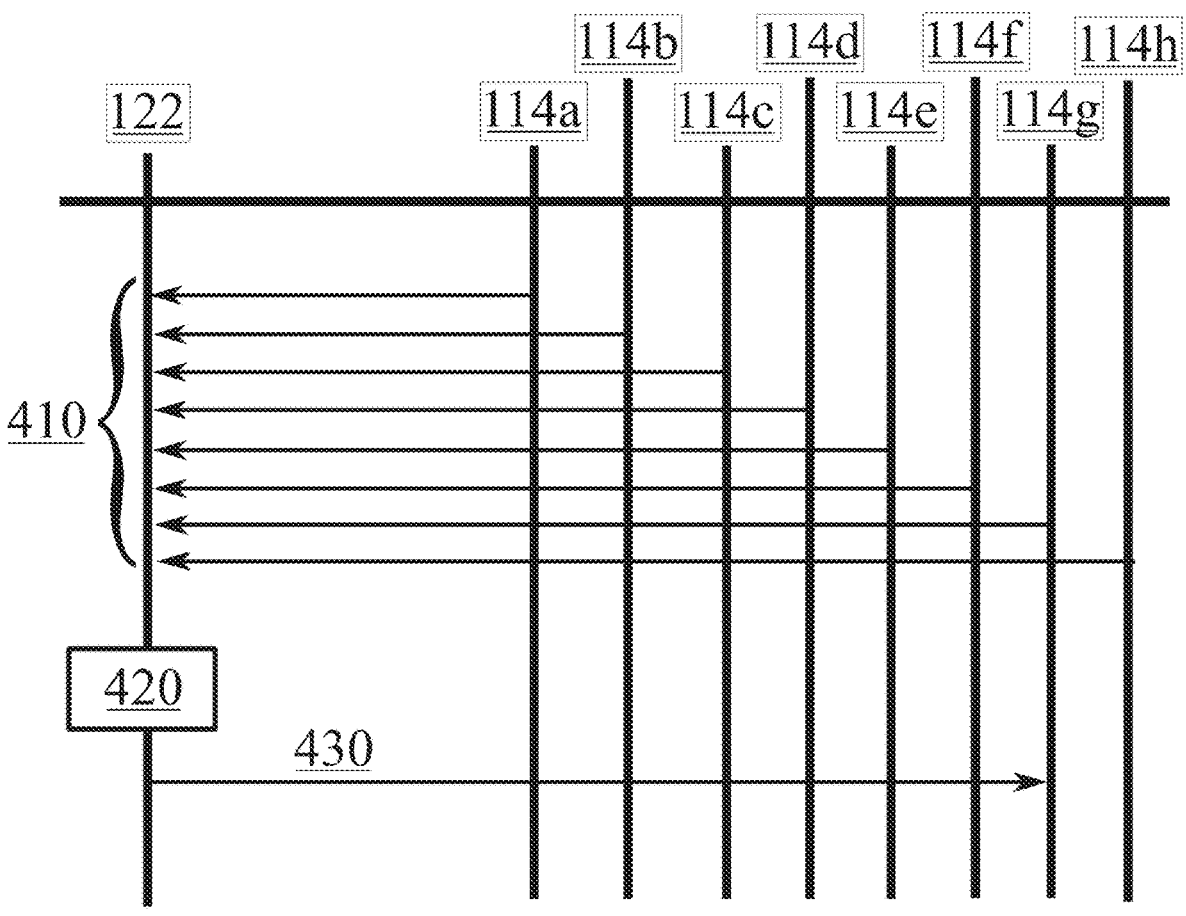
FIG. 4 illustrates a signalling graph in accordance with at least some embodiments.

FIG. 4 illustrates signalling in accordance with at least some embodiments. On the vertical axes are disposed, from the left to the right, apparatus 122 and cells 114a-h of FIGS. 1 and 2, respectively.

At step 410, apparatus 122 may receive information identifying the at least two first cells (cells 114a, 114c, 114e, 114g and 114h) configured to use the first cell parameter value (PCI #1) and a cause cell for each of the at least two first cells. For instance, apparatus 122 may receive from each cell a cell parameter value that the cell is configured to use and based on the topology of the cellular communication network identify the at least two first cells and the cause cell for each of the at least two first cell. Alternatively, in some embodiments, the configurations may be received for example an OSS, possibly as CM data.

At step 420, apparatus 122 may determine the at least two first cells based on the received information. Apparatus 122 may also determine a cause cell for each of the at least two first cells and sort the cause cells into a list in the order of occurrence as a cause cell. At step 430, apparatus 122 may configure a first cell in the list, like cell 114g, to use the second cell parameter value. After that, apparatus 122 may check whether any further conflicts exist.

FIG. 5 is a flow graph of a method in accordance with at least some embodiments. The phases of the illustrated method may be performed for example by apparatus 122, or a control device configured the operation of apparatus 122, possibly when installed therein.

At phase 510, the method may comprise determining at least two first cells, wherein the at least two first cells are configured to use a first cell parameter value in the cellular communication network. The method may also comprise, at phase 520, determining a cause cell for each of the at least two first cells, wherein the cause cells are cells that are configured to use the first cell parameter value and each cause cell is within a predetermined number of hops from a respective first cell. In addition, the method may comprise, at step 530, sorting, by the apparatus, the cause cells into a list in the order of number of occurrences as a cause cell. Finally, the method may comprise, at step 540, configuring a first cell in the list to use a second cell parameter value.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in cellular communication networks.

ACRONYMS LIST

3GPP 3$^{rd}$ Generation Partnership Project
5G Fifth Generation
AMF Access and Mobility management Function
BCCH Broadcast Control Channel
BSIC Base Station Identity Code
CM Configuration Management
IoT Internet of Things
MME Mobility Management Entity
NR New Radio
OSS Operations Support System
PCI Physical Cell Identifier
RAN Radio Access Network
SC Scrambling Code
UE User Equipment
WLAN Wireless Local Area Network

REFERENCE SIGNS LIST

| | |
|---|---|
| 100 | Cellular communication network |
| 110 | Radio Access Network |
| 112 | Base station |
| 114, 114a-h | Cells |
| 116 | UE |
| 120 | Core network |
| 122 | Apparatus for network optimization |
| 300-360 | Structure of the device of FIG. 3 |
| 410-430 | Steps in the signalling graph of FIG. 4 |
| 510-540 | Phases of the method of FIG. 5 |

The invention claimed is:

1. A method for network optimization in a cellular communication network, comprising:
    determining, by an apparatus of a core network, at least two first cells, wherein the at least two first cells are configured to use a first cell parameter value in the cellular communication network;
    determining, by the apparatus, a cause cell for each of the at least two first cells, wherein the cause cells are cells that are configured to use the first cell parameter value and each cause cell is within a predetermined number of hops from a respective first cell;

sorting, by the apparatus, the cause cells into a list in the order of number of occurrences as a cause cell;

configuring, by the apparatus, the cause cell with the highest number of occurrences to use a second cell parameter value, wherein the highest number of occurrences is at least two conflicts for the cause cell with different first cells; and determining by the apparatus, after configuring the cause cell with the highest number of occurrences in the list to use the second cell parameter value, whether a second cause cell in the list needs to be configured to use a third cell parameter value.

2. The method according to claim 1, wherein the cell parameter value is a physical cell identifier.

3. The method according to claim 1, wherein the cell parameter value is a parameter value that the cells are configured to use.

4. The method according to claim 1, further comprising:
receiving, by the apparatus, information identifying the at least two first cells configured to use the first cell parameter value and the cause cell for each of the at least two first cells; and determining, by the apparatus, the at least two first cells based on said information.

5. The method according to claim 1, further comprising:
searching, by the apparatus, for at least one first conflict within one hop of one cell;

searching, by the apparatus, for at least one second conflict within two hops of said one cell; and determining that said one cell belongs to the at least two first cells if at least one of the at least one first conflict or the at least one second conflict is found.

6. The method according to claim 1, wherein the at least two first cells comprise the cause cells.

7. The method according to claim 1, wherein the first cell parameter value is different than the second cell parameter value.

8. The method according to claim 1, further comprising:
determining by the apparatus, after configuring the first cell in the list to use the second cell parameter value, that a second cell in the list needs to be configured to use a third cell parameter value; and configuring, by the apparatus, the second cell in the list to use the third cell parameter value.

9. The method according to claim 1, further comprising:
determining by the apparatus, after configuring the first cell in the list to use the second cell parameter value, that a second cell in the list does not need to be configured to use a third cell parameter value; and refraining, by the apparatus, from changing the configuration of the second cell in the list to use the first cell parameter value.

10. The method according to claim 1, further comprising:
configuring, by the apparatus, the first cell in the list to use the second cell parameter value by changing a value of a cell parameter value of the first cell.

11. The method according to claim 1, wherein the apparatus is configured to operate in the cellular communication network according to at least one standard specification of $3^{rd}$ generation partnership program.

12. An apparatus of a core network, comprising at least one processing core and at least one memory storing instructions that, when executed by the at least one processing core, cause the apparatus at least to:
determine at least two first cells, wherein the at least two first cells are configured to use a first cell parameter value in a cellular communication network;

determine a cause cell for each of the at least two first cells, wherein the cause cells are cells that are configured to use the first cell parameter value and each cause cell is within a predetermined number of hops from a respective first cell;

sort the cause cells into a list in the order of number of occurrences as a cause cell;

configure the cause cell with the highest number of occurrences to use a second cell parameter value, wherein the highest number of occurrences is at least two conflicts for the cause cell with different first cells;

and determine by the apparatus, after configuring the cause cell with the highest number of occurrences in the list to use the second cell parameter value, whether a second cause cell in the list needs to be configured to use a third cell parameter value.

13. The apparatus according to claim 12, wherein the cell parameter value is a cell identifier.

14. The apparatus according to claim 12, wherein the cell parameter value is a parameter value that the cells are configured to use, comprising at least one of scrambling codes, base station identity codes or broadcast control channel parameters.

15. The apparatus according to claim 12, wherein the at least one processing core and the at least one memory further cause, when executed by the at least one processing core, the apparatus at least to:
receive information identifying the at least two first cells configured to use the first cell parameter value and the cause cell for each of the at least two first cells; and determine the at least two first cells based on said information.

16. The apparatus according to claim 12, wherein the at least one processing core and the at least one memory further cause, when executed by the at least one processing core, the apparatus at least to:
search for at least one first conflict within one hop of one cell;

search for at least one second conflict within two hops of said one cell; and determine that said one cell belongs to the at least two first cells if at least one of the at least one first conflict or the at least one second conflict is found.

17. The apparatus according to claim 12, wherein the at least two first cells comprise the cause cells.

18. The apparatus according to claim 12, wherein the first cell parameter value is different than the second cell parameter value.

19. A non-transitory computer readable medium having stored thereon a set of computer readable instructions that, when executed by at least one processor, cause an apparatus of a core network to:
determine at least two first cells, wherein the at least two first cells are configured to use a first cell parameter value in a cellular communication network;

determine a cause cell for each of the at least two first cells, wherein the cause cells are cells that are configured to use the first cell parameter value and each cause cell is within a predetermined number of hops from a respective first cell;

sort the cause cells into a list in the order of number of occurrences as a cause cell;

configure the cause cell with the highest number of occurrences to use a second cell parameter value, wherein the highest number of occurrences is at least two conflicts for the cause cell with different first cells;

and determine by the apparatus, after configuring the cause cell with the highest number of occurrences in the list to use the second cell parameter value, whether a second cause cell in the list needs to be configured to use a third cell parameter value.

* * * * *